(No Model.)
J. L. MILLER & W. T. CROSSE.
COMPOSITION OF MATTER FOR MAKING CHALK ENGRAVING PLATES.
No. 514,015. Patented Feb. 6, 1894.
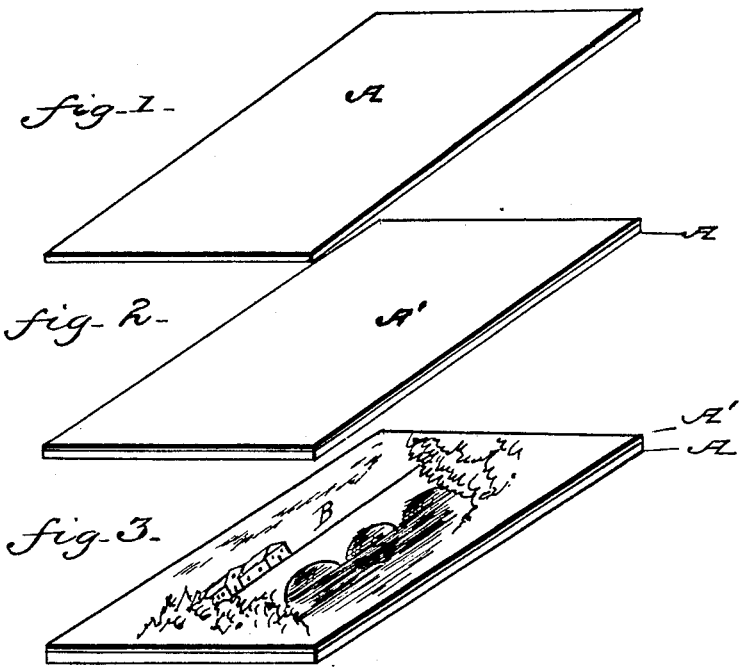
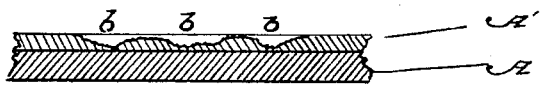
Joseph L. Miller
Willey T. Crosse
INVENTORS;
By J. H. Stevenson,
Attorney
WITNESSES

UNITED STATES PATENT OFFICE.

JOSEPH L. MILLER AND WILLEY T. CROSSE, OF PITTSBURG, PENNSYLVANIA.

COMPOSITION OF MATTER FOR MAKING CHALK ENGRAVING-PLATES.

SPECIFICATION forming part of Letters Patent No. 514,015, dated February 6, 1894.

Application filed August 29, 1893. Serial No. 484,331. (No specimens.)

*To all whom it may concern:*

Be it known that we, JOSEPH L. MILLER and WILLEY T. CROSSE, citizens of the United States, residing at Pittsburg, in the county of Allegheny and State of Pennsylvania, have invented certain new and useful Improvements in Composition of Matter for Making Chalk Engraving-Plates; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to a new composition of matter for making chalk engraving plates substantially as disclosed herein.

In the accompanying drawings Figure 1 is an ordinary steel plate. Fig. 2 is a similar plate with our composition thereon ready for the artist's pencil. Fig. 3 is a plate similar to Fig. 2 with a figure or picture cut thereon and Fig. 4 is a cross section of Fig. 3, exaggerated in size.

In preparing the plate for the engraver we make a substance out of the following ingredients and in the proportions specified, to wit: first, two and one-half drams of silicate of soda; second, four drams of silicate of magnesia; third, one half pound of French chalk; fourth, one pound of barytes, and is compounded as follows: We take the two and one-half drams of silicate of soda and dissolve the same in six (6) ounces of distilled water and then we add the four ounces of silicate of magnesia. When this is thoroughly mixed we add the other two ingredients, French chalk and barytes, in the said proportions. The mixture thus made is ready to pour on the steel plate seen in Fig. 1, and when this is done the plate is subjected to a heat sufficient to bake the same. The proportions and quantities aforesaid will be sufficient for a plate five inches by eight inches. The baking of said plate may be done in an ordinary oven or on top of a stove. This baking is continued until scales appear on the surface of the plate when it may be considered done. After this baking is done the rough surface of the plate is raked or scraped off which may be done by a knife blade or the like, and then it is ready for the pencil of the engraver.

The composition made as aforesaid has superior adhesive qualities, taking a better "bond" than any like chalk substances used for the purpose and besides our compound has superior refractory qualities so that in making the cast no perceptible injury is done to the plate and hence any number of casts may be taken from one of our prepared plates, as the bond is good and heat has no effect on the plate. As made our plates will be soft on the surface so as to be easily cut into by the artist's pencil and besides the adhesive quality or bond being superior to any other plate, there is not so much danger of the plate being injured by sudden jarring as is common in handling the same.

In the drawings A represents the steel plate on which our composition is placed.

A' is the chalk engraving substance on the plate.

B represents a figure cut in the surface of the plate.

*b b* show cuttings in the plate.

We are aware that French chalk, silicate of soda and barytes have been used in proportions similar or for like purpose as ours, but we add to these the important ingredient silicate of magnesia and thus produce a much superior engraving substance.

Having thus described our invention, what we claim, and desire to secure by Letters Patent of the United States, is—

The composition of matter for chalk engraving plates herein described, consisting of silicate of soda; silicate of magnesia; French chalk and barytes; prepared in the manner and proportions stated.

In testimony whereof we affix our signatures in presence of two witnesses.

JOSEPH L. MILLER.
WILLEY T. CROSSE.

Witnesses:
ANDREW PATTERSON,
A. R. MOON.